(12) United States Patent
Bailey, Jr. et al.

(10) Patent No.: US 7,404,897 B2
(45) Date of Patent: Jul. 29, 2008

(54) METHOD FOR NITROGEN REMOVAL AND TREATMENT OF DIGESTER REJECT WATER IN WASTEWATER USING BIOAUGMENTATION

(75) Inventors: Walter F. Bailey, Jr., Washington, DC (US); Sudhir N. Murthy, Washington, DC (US); Leonard Benson, Washington, DC (US); Timothy Constantine, Toronto (CA); Glen T. Daigger, Englewood, CO (US); Thomas E. Sadick, Newport News, VA (US); Dimitrios Katehis, Chalfont, PA (US)

(73) Assignee: D.C. Water & Sewer Authority, Washington, DC (US)

( * ) Notice: Subject to any disclaimer, the term of this patent is extended or adjusted under 35 U.S.C. 154(b) by 92 days.

(21) Appl. No.: 11/585,796

(22) Filed: Oct. 25, 2006

(65) Prior Publication Data
US 2007/0102356 A1 May 10, 2007

Related U.S. Application Data

(60) Provisional application No. 60/730,035, filed on Oct. 26, 2005.

(51) Int. Cl.
C02F 3/00 (2006.01)
(52) U.S. Cl. .................. 210/607; 210/610; 210/625; 210/626
(58) Field of Classification Search .......... 210/607, 210/610, 625–626
See application file for complete search history.

(56) References Cited

U.S. PATENT DOCUMENTS

| 4,537,682 | A | 8/1985 | Wong-Chong |
| 5,447,633 | A | 9/1995 | Matsche et al. |
| 5,705,072 | A | 1/1998 | Haase |
| 5,811,009 | A * | 9/1998 | Kos ........................... 210/605 |
| 6,163,932 | A | 12/2000 | Rosen |
| 6,190,554 | B1 | 2/2001 | Mandt |
| 6,207,059 | B1 | 3/2001 | Moore, III |
| 6,426,004 | B1 * | 7/2002 | Hiatt et al. ................ 210/605 |
| 6,602,417 | B1 * | 8/2003 | Zilverentant ............... 210/605 |
| 2007/0119763 | A1 * | 5/2007 | Probst ..................... 210/198.1 |

FOREIGN PATENT DOCUMENTS

CZ 291489 1/2002

OTHER PUBLICATIONS

S. Salem, et al., "Bio-Augmentation by Nitrification with Return Sludge," Water Research 37 (2003), pp. 1794-1804.

(Continued)

*Primary Examiner*—Chester T. Barry
(74) *Attorney, Agent, or Firm*—Dickstein Shapiro LLP

(57) ABSTRACT

An efficient system and process for removing nitrogen from wastewater while enriching seed sludge in the mainstream treatment process. Bioaugmentation of seed autotrophic organisms facilitate the nitrification reactions by enhancing the rates of reaction advantageously within a smaller volume or within a shorter activated sludge solids retention time. Likewise, bioaugmentation of seed denitrification organisms will also enhance rate of reaction within a smaller volume or shorter activated sludge solids retention time. Separate treatment of high ammonia digester reject water is an efficient method to treat nitrogen in recycle streams as well as to enrich the seed nitrifying and denitrifying cultures.

16 Claims, 4 Drawing Sheets

OTHER PUBLICATIONS

P. Kumar et al., "Upgrading Wastewater Treatment by Water Hyacinth in Developing Countries," Wat. Sci. Tech., vol. 22, No. 7/8, pp. 153-160, 1990.

Krhutkova, O., et al., "In situ bioaugmentation of nitrification in the regeneration zone: practical application and experiences at full-scale plants," Water Science and Technology, 2006, vol. 53, No. 12; pp. 39-46.

Constantine, T., et al., Alternatives for Treating High Nitrogen Liquor from Advanced Anaerobic Digestion at the Blue Plains AWTP, 2005, Proceedings of WEFTEC, Washington, DC.

Salem, S., et al., "Full-Scale Application of the BABE® Technology", Water Science and Technology, 2004, vol. 50, No. 7; pp. 87-96.

Rosen, B., et al., "The ScanDeNi® process could turn an existing under-performing activated sludge plant into an asset," Water Science and Technology, 2003, vol. 47, No. 11; pp. 31-36.

Salem, S., et al., "Model-based evaluation of a new upgrading concept for N-removal," Water Science and Technology, 2002, vol. 45, No. 6; pp. 169-176.

Kalehis, D., et al., "Enhancement of Nitrogen Removal thru Innovative Integration of Centrate Treatment," 2002, Proceedings of WEFTEC, Chicago, IL.

Kos, P., "Short SRT (Solids Retention Time) Nitrification Process/Flowsheet," Water Science Technology, 1998, vol. 38, No. 1; pp. 23-29.

Kos, M., et al., "R-D-N Activated Sludge Process," Water Science Technology, 1992, vol. 25, No. 4/5; pp. 151-160.

Wanner, J., et al., "An Innovative Technology for Upgrading Nutrient Removal Activated Sludge Plants," Water Science Technology, 1990, vol. 22, No. 7/8; pp. 9-20.

International Search Report dated Jan. 17, 2008.

* cited by examiner

METHOD FOR NITROGEN REMOVAL AND TREATMENT OF DIGESTER REJECT WATER IN WASTEWATER USING BIOAUGMENTATION

CROSS REFERENCE TO RELATED APPLICATIONS

The present application claims priority to U.S. Provisional Patent Application Ser. No. 60/730,035, filed on Oct. 26, 2005, the disclosure of which is incorporated by reference in its entirety.

FIELD OF THE INVENTION

The present invention relates generally to wastewater treatment and in particular to the treatment of digest reject water.

BACKGROUND OF THE INVENTION

With reference to FIG. 1, a block diagram of a conventional wastewater treatment process is shown. The treatment includes influent wastewater 111 being settled in a primary settling basin 110. Settled sludge 115 (i.e., primary sludge) is sent to an anaerobic sludge digester 140, while the settled wastewater 112 is sent for secondary treatment. This secondary treatment may include biological aeration in aeration tanks 120 and a final settling process in a final settling basin 130. A portion of the sludge 114 from the final settling basin 130 is returned to the secondary treatment in order to maintain biological compounds in the influent. Effluent water stream 118 that meets water quality standards is output from the final settling basin 130. The remainder of the waste activated sludge 113 from the final settling basin 130 is sent to the anaerobic sludge digester 140. After the anaerobic sludge digestion process, the removed water 116 is mixed with the incoming influent wastewater 111 and the stabilized solids (biosolids) 117 are now safe for application as fertilizers, for example.

One problem that plagues conventional wastewater treatment plants is nitrogen removal to meet effluent discharge water quality standards. There are various sources of nitrogen in municipal wastewater, including human feces, industrial wastes, and other garbage. Typically, nitrogen removal at wastewater treatment plants is achieved by a series of nitrification and denitrification steps. Specifically, nitrifying bacteria convert ammonia to nitrite and subsequently to nitrate, followed by denitrification of nitrite or nitrate to nitrogen gas. The general chemical equations for these processes are:

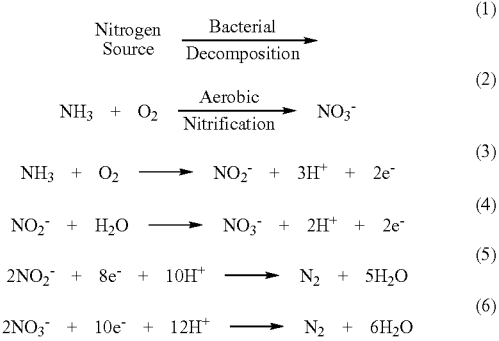

The capability to remove nitrogen is constrained by the rate limiting aerobic nitrification reactions to convert ammonia to nitrite and/or nitrate by slow growing autotrophic organisms. The cumulative volume requirements for nitrogen removal depends on the completion of these reactions. Accordingly, there is a need and desire for a more efficient nitrogen removal process by encouraging the nitrification/denitrification processes in the mainstream reactor.

BRIEF SUMMARY OF THE INVENTION

The present invention, as illustrated in the various exemplary embodiments, includes an efficient process for removing nitrogen from wastewater while enriching seed sludge in the mainstream treatment process. Bioaugmentation of seed autotrophic organisms will facilitate the nitrification reactions by enhancing the rates of reaction within a smaller volume or within a shorter activated sludge solids retention time ("SRT"). Likewise, bioaugmentation of seed denitrification organisms will also enhance the rate of reaction within a smaller volume or shorter activated sludge solids retention time. Additionally, separate treatment of high ammonia digester reject water is an efficient method to treat nitrogen in recycle streams as well as to enrich the seed nitrifying and denitrifying cultures.

In accordance with one exemplary aspect of the invention, direct mainstream bioaugmentation of sludge is performed and at least a part of the treated seed sludge is returned to a part of the mainstream reactor.

In accordance with a second exemplary aspect of the invention, sidestream bioaugmentation is performed in a seed production reactor, and at least a part of the bioaugmentation sludge is returned to a mainstream reactor. In accordance with a third exemplary aspect of the invention, at least a part of the bioaugmentation sludge is returned to a mainstream reactor and a remaining portion of the bioaugmentation sludge is returned to the seed production reactor.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

In accordance with the invention, and as described in more detail below with respect to FIGS. 2-4, exemplary wastewater treatment systems include a mainstream and a seed production reactor. It should be understood that with each exemplary system, other wastewater treatment processes (not shown) may be used in conjunction with the described processes. These other processes in no way affect the scope of the present invention.

In accordance with the invention, seed sludge is generated in a seed production reactor. The seed production reactor is a nitrification and denitrification process that receives a low strength ammonia wastewater that is first nitrified and subsequently denitrified using an external carbon substrate such as methanol, ethanol, acetic acid, sugar, glycol or glycerol. These denitrifying carbon substrates will produce specialized organisms for denitrification. The influent to the seed production reactor consists of mainly ammonia and very little carbonaceous substrate. Autotrophic conditions are promoted, allowing organisms to use ammonia as an energy source and convert it to nitrate, thus producing an enriched population of autotrophic (nitrifying) seed organisms. Subsequently, anoxic conditions are promoted for denitrification using external carbon, thus producing an enriched population of denitrifying seed organisms. The effluent is then sent to a settling basin.

Figure 1:
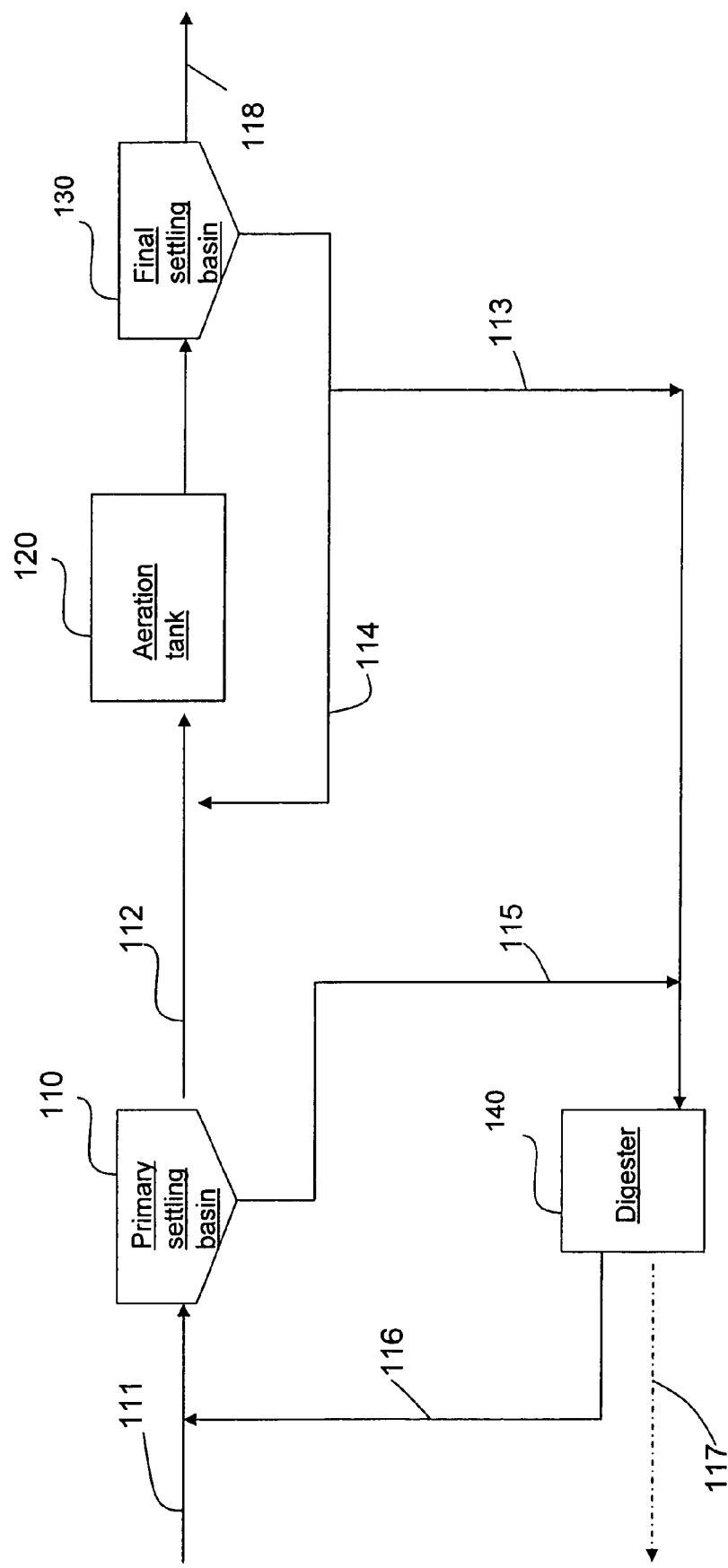
FIG. 1 is a block diagram of a conventional wastewater treatment process.
Figure 2:
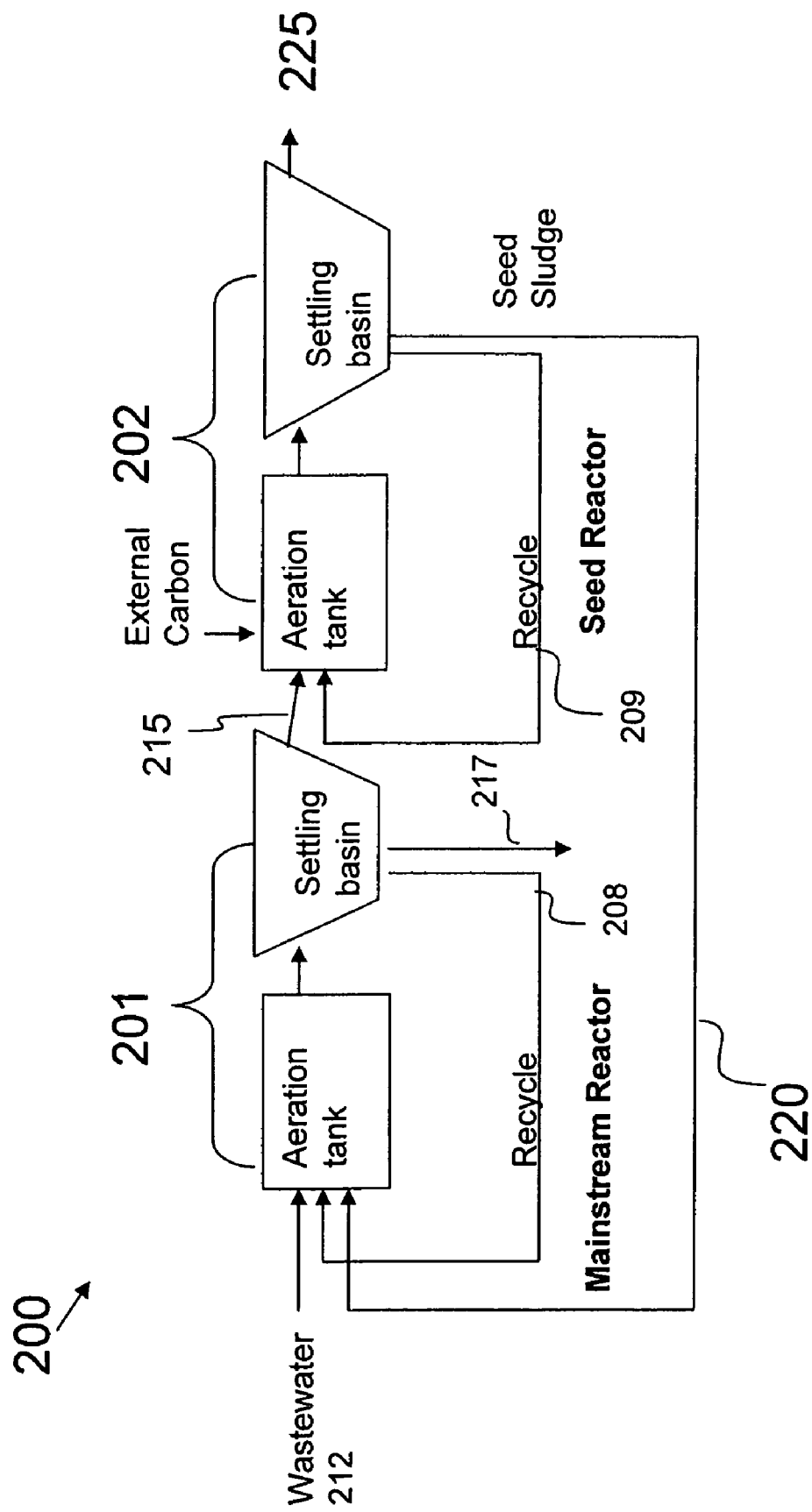
FIG. 2 is a block diagram of a portion of a wastewater treatment process in accordance with a first exemplary embodiment of the invention.

Portions of a first exemplary waste water treatment system 200 are shown in FIG. 2. It should be understood that the wastewater flow 212 entering the system 200 may be similar to the flow 112 described above with reference to effluent from a primary clarifier (settling basin 110) in FIG. 1. In accordance with this first exemplary bioaugmentation process, a steady state quantity of the autotrophic seed sludge 220 is recovered and sent to the mainstream high rate bioaugmentation reactor, or mainstream reactor 201, where nitrification is promoted. The control of ammonia flow in the effluent of the mainstream flow 215 to the seed production reactor 202 for seed generation and maintenance of steady state seed quantity is important for process stability. This control is achieved by varying the mainstream flow 215 or volume subject to seed nitrification. The steady state quantity of seed is achieved by sending the seed to only part of the mainstream bioaugmentation process (between 30-60% flow or process volume), in a manner to encourage sufficient but not excessive nitrification in the mainstream process. Sufficient ammonia is allowed to flow into the seed production reactor 202 for seed regeneration and steady state maintenance.

The mainstream bioaugmentation 201 and seed 202 reactors are operated at normal seasonal water temperatures (10° C. to 27° C.) and pH (6.5-7.5). The mainstream reactor 201 is operated aggressively at a low SRT of 0.5-3 days for carbonaceous substrate removal with seed enhanced nitrification and simultaneous or staged step-feed denitrification/nitrification. The seed production reactor 202 is operated in the SRT range of 7-20 days, with an optimum range of 10-15 days.

As shown in FIG. 2, return activated sludge 208, 209 of each of the mainstream 201 and the seed 202 reactors, respectively, may be used as a recycle stream 208, 209 to further enhance biological reactions in these reactors 201, 202. In addition, the waste sludge 217 can be further treated using lime stabilization, anaerobic digestion, or other known sludge treatment techniques. The treated waste sludge 217 may then be sent for final disposal and/or management. Effluent water 225 from the seed production reactor 202 may be further processed, as desired. Other processes for treating the seed production reactor effluent water 225, such as tertiary treatments, are beyond the scope of the present invention.

Thus, unlike conventional seed treatment processes, the first exemplary system 200 provides for the seeding of a mainstream reactor process. This advantageously helps to: (1) maintain the steady state seed mass, (2) control addition of seed to a partial flow/volume in the mainstream process, and (3) and provide for denitrification of seed derived nitrate simultaneously or sequentially within the mainstream process using a step-feed process.

The advantages of this first exemplary system 200 include: lower methanol requirements of between 25-50% for denitrification through reductions in overall ammonia and subsequent nitrate loads in the seed production reactor, lower denitrification volume requirements of between 25-50% through reductions in nitrate loads, and lower nitrification volume requirements of between 25-50% through reductions in ammonia loads.

Figure 3:
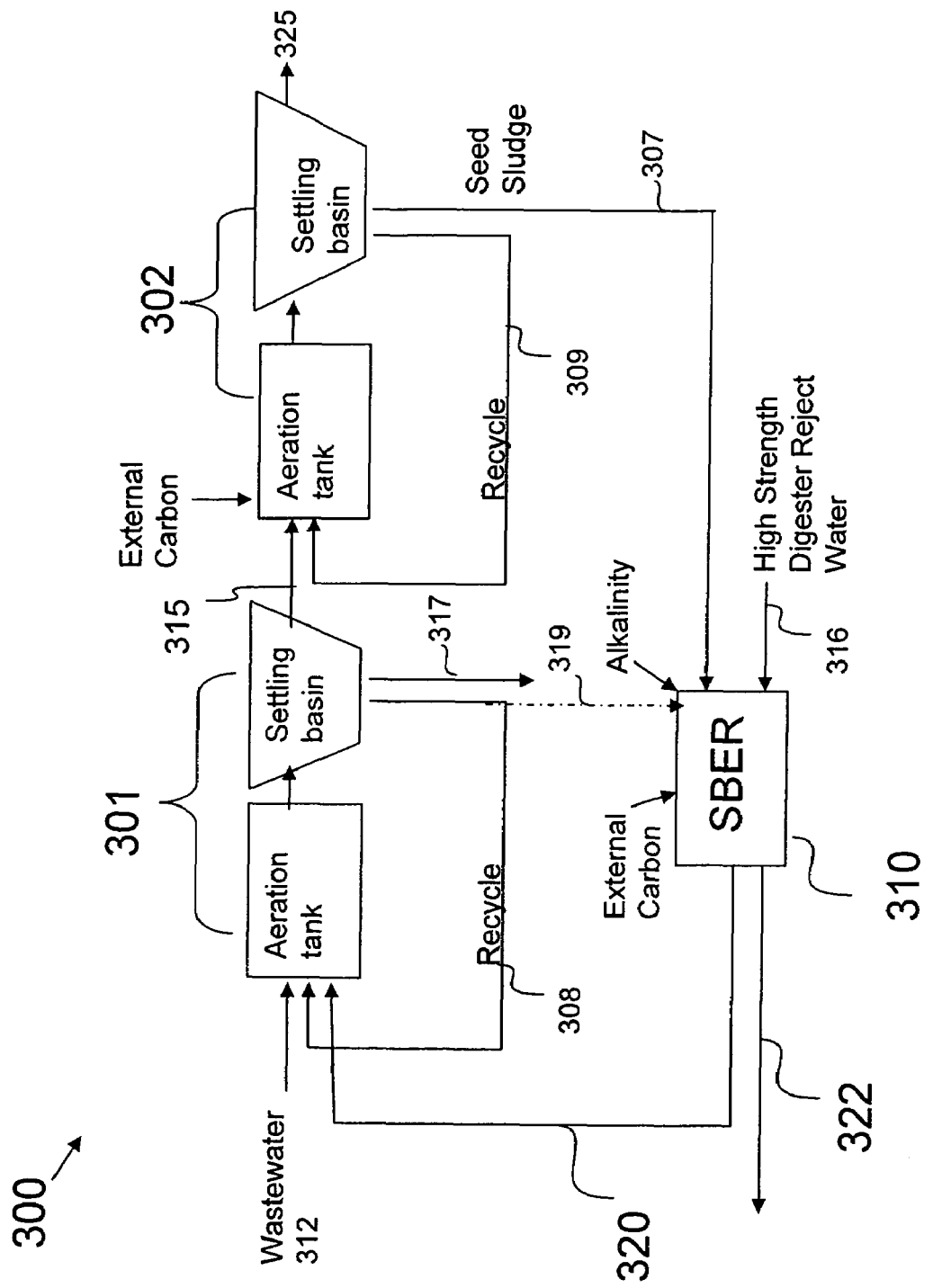
FIG. 3 is a block diagram of a portion of a wastewater treatment process in accordance with a second exemplary embodiment of the invention.

Turning to FIG. 3, a second exemplary wastewater treatment system 300 is shown. The second system 300 includes a mainstream reactor 301 having a wastewater influent 312 and a mainstream effluent 315 that is sent to a seed production reactor 302. In accordance with the second exemplary embodiment of the invention, a steady state quantity of seed organism 307 generated by the seed production reactor 302 is sent to a sidestream process, the Sidestream Bioaugmentation and Enrichment Reactor ("SBER") 310. The SBER is also fed a high strength anaerobic digester reject water recycle 316, and may receive additional inputs of carbon sources for denitrification and alkalinity, as necessary to maintain the desired pH levels. Accordingly, the sludge stabilization technique for a system in accordance with this embodiment is likely anaerobic digestion in order to produce the high strength reject water 316. Return activate sludge 308, 309 is used as a recycle stream in mainstream and seed production reactors, 301, 302.

The SBER 310 is operated at a temperature somewhat higher than the mainstream process 301. The temperature of the SBER 310 is approximately between 2 and 20 degrees Celsius higher than the mainstream reactor 301 and represents a volume-averaged temperature of the higher temperature incoming reject water 316 recycle and the seed sludge 307. This temperature is high enough to improve rates of nitrification and denitrification in the SBER 310, but low enough to allow the seed population to grow in both the SBER 310 and mainstream reactor 301. The solids retention time (SRT) of the SBER 310 is maintained between 1 and 5 days aerobic SRT and between 1 and 5 days anoxic SRT. The pH in the SBER 310 is maintained between 6.0-8.5 with an optimum range of 6.5-7.5. The dissolved oxygen concentration can be maintained as high as 5 mg/L and as low as 0.2 mg/L, during aerobic operations. The optimum dissolved oxygen concentration will depend on the final reactions desired in the SBER If the reactions need to stop at nitrite, the optimum dissolved oxygen is lower. If the reaction proceeds to produce nitrate, the optimum dissolved oxygen concentration is higher. In accordance with an embodiment, the optimum dissolved oxygen concentration is 2 mg/L.

The reject water 316 is treated; nitrified and then denitrified (using the same external carbon source as the seed production reactor) in this initial bioaugmentation step. This step also serves as a seed enrichment step, to increase the yield of seed nitrifying and denitrifying sludge. The enriched seed 320 is then sent to the mainstream reactor 301 to perform bioaugmentation. The enriched seed 320 has a high capability to perform nitrification in the mainstream reactor 301. The mainstream 301 and seed production reactors 302 are operated at normal seasonal water temperatures (10° C. to 27° C.)

and pH (6.5-7.5). The mainstream reactor 301 is operated aggressively at a low SRT of within the range of about 0.5-3 days for carbonaceous substrate removal with seed enhanced nitrification and simultaneous or staged step-feed denitrification/nitrification. The seed production reactor 302 is operated in the SRT range of 7-20 days, with an optimum range of 10-15 days. For maintenance of steady-state seed sludge, the same description in the first exemplary system 200, applies.

As discussed above with reference to FIG. 2, a part of the effluent of each of the mainstream 301 and the seed 302 reactors may be used as recycle streams 308, 309, respectively, to further enhance biological reactions in these reactors 301, 302. In addition, part of the effluent 319 from the mainstream reactor 301 may be sent to the SBER 310 for bioaugmentation processing directly and if necessary to control the formation of nitrate. It may be desirable to stop the nitrification reaction at nitrite by reducing the dissolved oxygen concentration, ammonia or nitrite inhibition, or by the addition of effluent 319. These operations will result in the wash out of organisms responsible for promoting the second step of nitrification reaction. This partial nitrification process can limit the amount of air and external carbon necessary. Waste sludge 317 can be further stabilized and treated using known sludge treatment techniques. Effluent water 325 from the seed production reactor may be further processed, using known tertiary or other treatments, as desired.

Thus, unlike conventional processes, the second exemplary system 300 also provides for the seeding of a mainstream reactor process. Thus, the second exemplary system 300 appreciates the same advantages from seeding the mainstream process as discussed above.

Other advantages realized by this option include lower methanol requirements of 25-50% for denitrification through reductions in overall ammonia and subsequent nitrate loads in the seed production reactor, lower denitrification volume requirements of 25-50% through reductions in nitrate loads, lower nitrification volume requirements of 25-50% through reductions in ammonia loads, and the capability to treat high-strength reject water 316.

Figure 4:
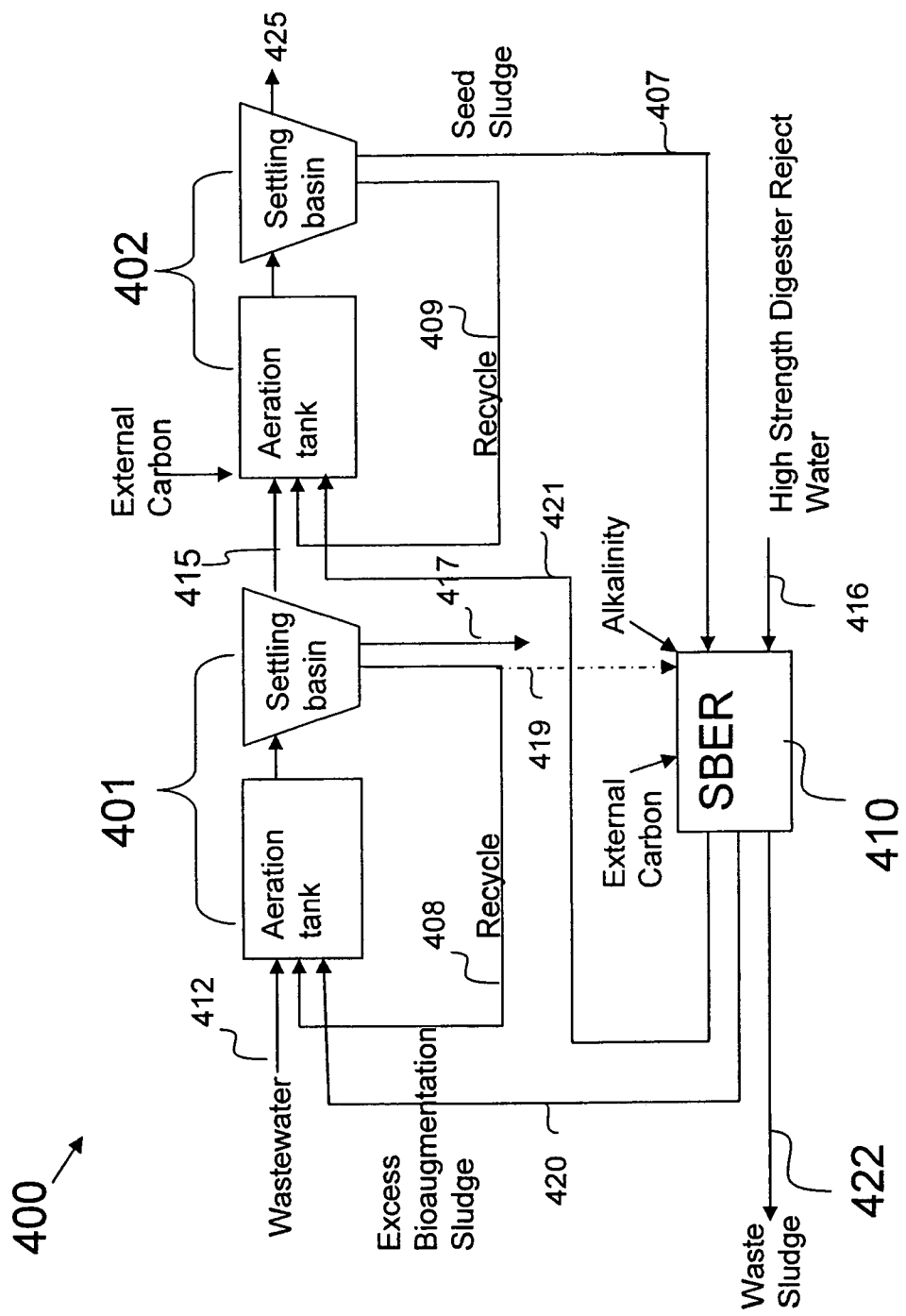
FIG. 4 is a block diagram of a portion of a wastewater treatment process in accordance with a third exemplary embodiment of the invention.

A third exemplary system 400 in accordance with the invention is shown in FIG. 4. The third system 400 includes a mainstream reactor 401 having a wastewater influent 412 and a mainstream reactor effluent 415 that is sent to a seed production reactor 402. Return activated sludge 408, 409 are used as recycle streams for each both reactors, 401, 402, respectively. In accordance with the invention, a steady state quantity of seed organism 407 is sent to a sidestream process, SBER 410 in the third exemplary system 400. The SBER 410 is also fed a high strength anaerobic digester reject water recycle 416, and other inputs may include carbonaceous substances and alkalinity. The sludge stabilization technique for a system in accordance with this exemplary embodiment is likely anaerobic digestion in order to produce the high strength reject water 416.

The SBER 410 is operated at a temperature somewhat higher than the mainstream process 401. The temperature of the SBER 410 is approximately between 2 and 20 degrees Celsius higher than the mainstream reactor 401 and represents a volume-averaged temperature of the higher temperature incoming reject water 416 recycle and the seed sludge 407. This temperature is high enough to improve rates of nitrification and denitrification in the SBER 410, but low enough to allow the seed population to grow in both the SBER 410 and mainstream reactor 401.

The solids retention time (SRT) of the SBER 410 is preferably maintained between about 1 and 5 days aerobic SRT and between 1 and 5 days anoxic SRT. The pH in the SBER 410 is maintained between 6.0 and 8.5 with an optimum range of 6.5 to 7.5. The dissolved oxygen concentration can be maintained as high as 5 mg/L and as low as 0.2 mg/L during aerobic operations. The optimum dissolved oxygen concentration will depend on the final reactions desired in the SBER. If the reactions need to stop at nitrite, the optimum dissolved oxygen is lower at approximately 0.5 mg/L. If the reaction needs to proceed to nitrate, the optimum dissolved oxygen concentration is higher, at approximately 2 mg/L.

The reject water 416 is treated; nitrified and then denitrified (using the same external carbon source as the seed production reactor) in this initial bioaugmentation step. This step also serves as a seed enrichment step, to increase the yield of seed nitrifying and denitrifying sludge. The enriched seed sludge 420 from the SBER 410 can be sent in part or in entirety to the mainstream reactor 401 and the remaining portion of the enriched seed is sent to the seed production reactor to maintain process stability in case of inhibition and process upsets and to perform additional bioaugmentation, if desired. Thus, a smaller stream 420 is sent to the mainstream reactor 401 to perform mainstream bioaugmentation.

The mainstream 401 and seed production reactors 402 are operated at normal seasonal water temperatures (10° C. to 27° C.) and pH (6.5-7.5). The mainstream reactor 401 is operated aggressively at a low SRT with the range of about 0.5-3 days for carbonaceous substrate removal with seed enhanced nitrification and simultaneous or staged step-feed denitrification/ nitrification. The seed production reactor 402 is preferably operated in the SRT range of about 7-20 days, with an optimum range of 10-15 days. For maintenance of steady-state seed sludge, the same description described above with reference to FIG. 2 applies.

As discussed above with reference to FIG. 2, a part of the effluent of each of the mainstream 401 and the seed 402 reactors may be used as recycle streams 408, 409, respectively, to further enhance biological reactions in these reactors 401, 402. In addition, the waste sludge 417 can be further treated using known sludge stabilization and treatment techniques. Effluent water 425 from the seed production reactor may be further processed, using tertiary or other known processing techniques, as desired. Another optional location for waste sludge is shown as effluent 422 from the SBER 410.

Like the first two exemplary embodiments, a steady-state seed sludge 420 is sent to the mainstream process 401 to perform nitrification and denitrification, but sufficient ammonia 421 is allowed to flow to the seed production reactor 402 for seed regeneration.

The third exemplary system 400 may be easier to control than the second exemplary system 300, since there is flexibility to send seed sludge 420, 421 to either process (mainstream reactor 401 or seed production reactor 402), thus the seed production reactor 402 can be sustained through the seed recycle 409, and does not need to completely depend on ammonia from mainstream reactor 401 for regeneration. It should be noted that waste sludge 422 may also be produced in this SBER 410 for external treatment, such as sludge stabilization prior to land disposal.

Another advantage of system 400 is the seeding of denitrifiers to the seed production reactor 402. Since the same external carbon source is used in both the seed production reactor 402 and SBER 410, the denitrifying populations are also enriched in the SBER 410 and available for bioaugmentation in the seed production reactor 402. Thus the denitrification volume requirements are reduced even more than in the first two exemplary systems 200, 300. In system 400, the high strength load from the digester reject water recycle 416 is treated (nitrified and denitrified) simultaneously as the seed sludge 407 is enriched.

Thus, unlike conventional processes, the third exemplary system 400 also provides for the seeding of a mainstream reactor process. Thus, the third exemplary system 400 appreciates the same advantageous from seeding the mainstream process as discussed above with reference to exemplary systems 200, 300.

Other advantages realized by system 400 include: lower methanol requirements of 25-50% for denitrification through reductions in overall ammonia and subsequent nitrate loads in the seed production reactor, lower denitrification volume requirements of 25-50% through reductions in nitrate loads and through seeding of denitrifiers, lower nitrification volume requirements of 25-50% through reductions in ammonia loads, and capability to treat high-strength reject water.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. For example, the mainstream reactor may consist of several tanks in parallel, some of which may undergo bioaugmentation while others remain unbioaugmented. Additionally, any modifications, though presently unforeseeable, of the present invention that come within the spirit and scope of the following claims should be considered part of the present invention.

What is claimed as new and desired to be protected by Letters Patent of the United States is:

1. A process for the mainstream treatment of nitrogen in a wastewater treatment system using bioaugmentation, the process comprising:
   a) introducing a low strength ammonia wastewater to a seed production reactor;
   b) creating autotrophic conditions in the seed production reactor to promote nitrification of the wastewater;
   c) introducing a carbon source to the seed production reactor;
   d) subsequently, creating anoxic conditions to promote denitirification of the wastewater in the seed production reactor; and
   e) recovering a portion of seed sludge produced after step d) and returning this to a mainstream reactor process.

2. The method of claim 1, wherein the carbon source comprises at least one of methanol, ethanol, acetic acid, sugar, glycol, and glycerol.

3. The method of claim 1, wherein the mainstream and seed production reactors are operated at a water temperature range of about 10 to about 27 degrees Celsius and a pH within the range of about 6.5 to about 7.5.

4. The method of claim 1, wherein the mainstream reactor is operated with a solids retention time within the range of about 0.5 to about 3 days and wherein the seed production reactor is operated with a solids retention range within the range of about 7 to about 20 days.

5. The method of claim 1, wherein a quantity of seed organism is sent to a sidestream bioaugmentation and enrichment reactor ("SBER") which also receives digester reject water.

6. The method of claim 5, wherein the SBER is operated at a water temperature that is approximately 2 to 20 degrees Celsius greater than the water temperature during operation of the mainstream process.

7. The method of claim 5, wherein the SBER is operated to have a solids retention time ("SRT") within the range of about 1 to about 5 days aerobic SRT and between 1 and about 5 days anoxic SRT.

8. The method of claim 5, further comprising:
   enriching the seed organism by:
   nitrifying the seed organism;
   subsequently denitrifying the seed organism; and
   returning at least a portion of the enriched seed sludge to a mainstream reactor and the remainder of the enriched seed sludge to the seed production reactor.

9. The method of claim 8, wherein the step of returning at least a portion of the enriched seed sludge to a mainstream reactor comprises returning all of the enriched seed sludge produced to the mainstream reactor.

10. The method of claim 8, wherein the step of returning at least a portion of the enriched seed sludge to a mainstream reactor comprises:
    returning a portion of the enriched seed sludge produced to the mainstream reactor; and
    returning a portion of the enriched seed sludge to a nitrification/denitrification seed production reactor.

11. The method of claim 8, wherein the step of returning at least a portion of the enriched seed sludge to a mainstream reactor comprises returning an amount of seed sludge in the range of about 30 to about 60% by volume.

12. The method of claim 10, wherein the mainstream reactor is operated with a solids retention time within the range of about 0.5 to about 3 days for carbonaceous substrate removal and wherein the seed production reactor is operated with a solids retention range within the range of about 7 to about 20 days.

13. The method of claim 8, wherein the act of nitrifying the seed organism concludes with the formation of nitrite.

14. The method of claim 13, wherein the dissolved oxygen concentration during aerobic operation is less than about 1.0 mg/L.

15. The method of claim 1, wherein the step of creating autotrophic conditions further produces an enriched population of autotrophic seed organisms.

16. The method of claim 1, wherein the step of creating anoxic conditions further produces an enriched population of denitrifying seed organisms.

* * * * *